UNITED STATES PATENT OFFICE.

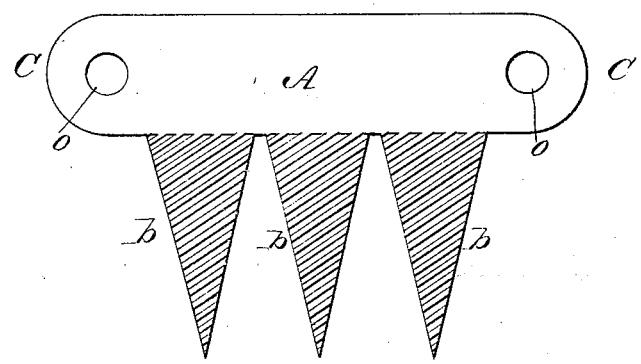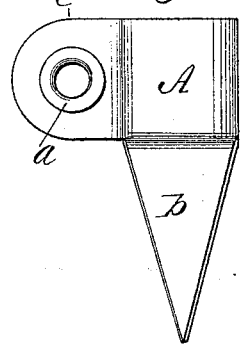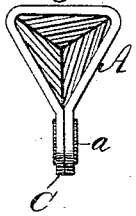

EDWARD M. CRANDAL, OF CHICAGO, ILLINOIS, ASSIGNOR TO THEODORE WASHBURN, OF ST. LOUIS, MISSOURI.

IMPROVEMENT IN PENCIL-SHARPENERS.

Specification forming part of Letters Patent No. 151,278, dated May 26, 1874; application filed April 6, 1874.

*To all whom it may concern:*

Be it known that I, EDWARD M. CRANDAL, of Chicago, in the county of Cook and State of Illinois, have invented certain Improvements in Pencil-Sharpeners, of which the following is a specification:

My invention consists in certain improvements in pencil-sharpeners, and is designed more especially for use in sharpening slate-pencils.

Various devices have been contrived for this purpose, many of which, however, have been found too expensive to manufacture, and some of which have not operated satisfactorily, owing to defective principles of construction.

The object of this invention is to produce a pencil-sharpener which shall be cheap, simple, and durable, and which shall be effective in its operation.

In order to accomplish these results I punch, stamp, or otherwise cut from sheet metal, a blank, A, of the form shown in Figure 1 of the drawing. In the ears C of this blank I form holes $o$, the purpose of which will be hereinafter explained. The points $b$ are then notched or grooved, as shown in Fig. 1, to form cutting edges or teeth, like those of a file. The blank is next bent into the form of a triangle, the ears C being brought together, as shown in Fig. 3. The holes $o$ in the ears C are so placed as to come exactly opposite each other when said ears are brought together, in order to allow an eyelet, $a$, to pass through them and fasten the ears C together, as shown in Figs. 2 and 3. The ears C may be secured by means of a rivet; but I prefer the use of an eyelet, as it forms a cheap and secure fastening, and at the same time provides a ready means of attaching the sharpener by a string to a slate or other article. The upper part being bent into the form of a triangle, and the ears C being secured together, as above described, the points $b$ are next bent inward at their lower ends until they come nearly into contact with each other, only sufficient space being left between them to allow the dirt and cuttings from the pencil to pass through, thus keeping the sharpener clear and free from all obstructions. The points $b$ are made of sufficient length to allow them to spring slightly, thus causing them to hug the pencil more tightly, and thus cause the sharpener to work with increased effect.

It will be observed that the blank, Fig. 1, is of such shape that when bent into the form above described, the sides of the upper portion will be vertical, while in the lower part the sides are inclined inward to give the proper form to the point of the pencil. This arrangement causes the upper part to act as a guide for the pencil, causing it to enter the sharpener in the proper position, and to maintain such position while being sharpened. The lower portion being inclined inward, and coming gradually to a point, permits the sharpener to receive pencils of any size.

It is obvious that the blank may be made with a single point, which shall have the teeth cut in it as above described, and which shall be of such form that it may be pressed or bent into the shape of a conical socket, thus dispensing with the use of eyelets and rivets; or it may be made with two points of semi-conical form, which, when brought together, will produce a conical sharpener; or it may be made with a number of points, which will cause it to assume a circular form at the upper part, and a conical form at the lower part, and consequently I do not limit myself to the number shown in the drawing.

By this construction I am enabled to produce a pencil-sharpener of superior qualities at a trifling cost, as the blank can be formed by a punch or press, the teeth cut by a milling or other machine, after which it is bent into the required form by a suitable machine.

After being made up it is tempered, and subsequently polished, which may be readily done in a tumbler, as the teeth, being inside, are protected from injury and wear.

It is obvious that the eyelet may be dispensed with in the form shown in the drawing, but I prefer to use it, as it makes a better article.

As above stated, the sharpener may be triangular, circular, or many-sided; but I prefer the triangular form, as it allows the pencil to touch but a small portion of the sharpener at one time, and consequently gives a larger clearing-space for the dirt and cuttings to work out.

Having thus described my invention, what I claim is—

1. A slate-pencil sharpener composed of sheet metal, having file-teeth cut on one surface, and then bent into the form of a cone, so as to present the file-teeth on all sides of its interior surface, substantially as described.

2. A slate-pencil sharpener constructed as described, with its upper portion A forming a tube-socket to guide the pencil, and thereby present it to the cutting-faces at a uniform angle, as set forth.

EDWARD M. CRANDAL.

Witnesses:
PHILIP STEIN,
N. A. FRANKEL.